Figure 1:
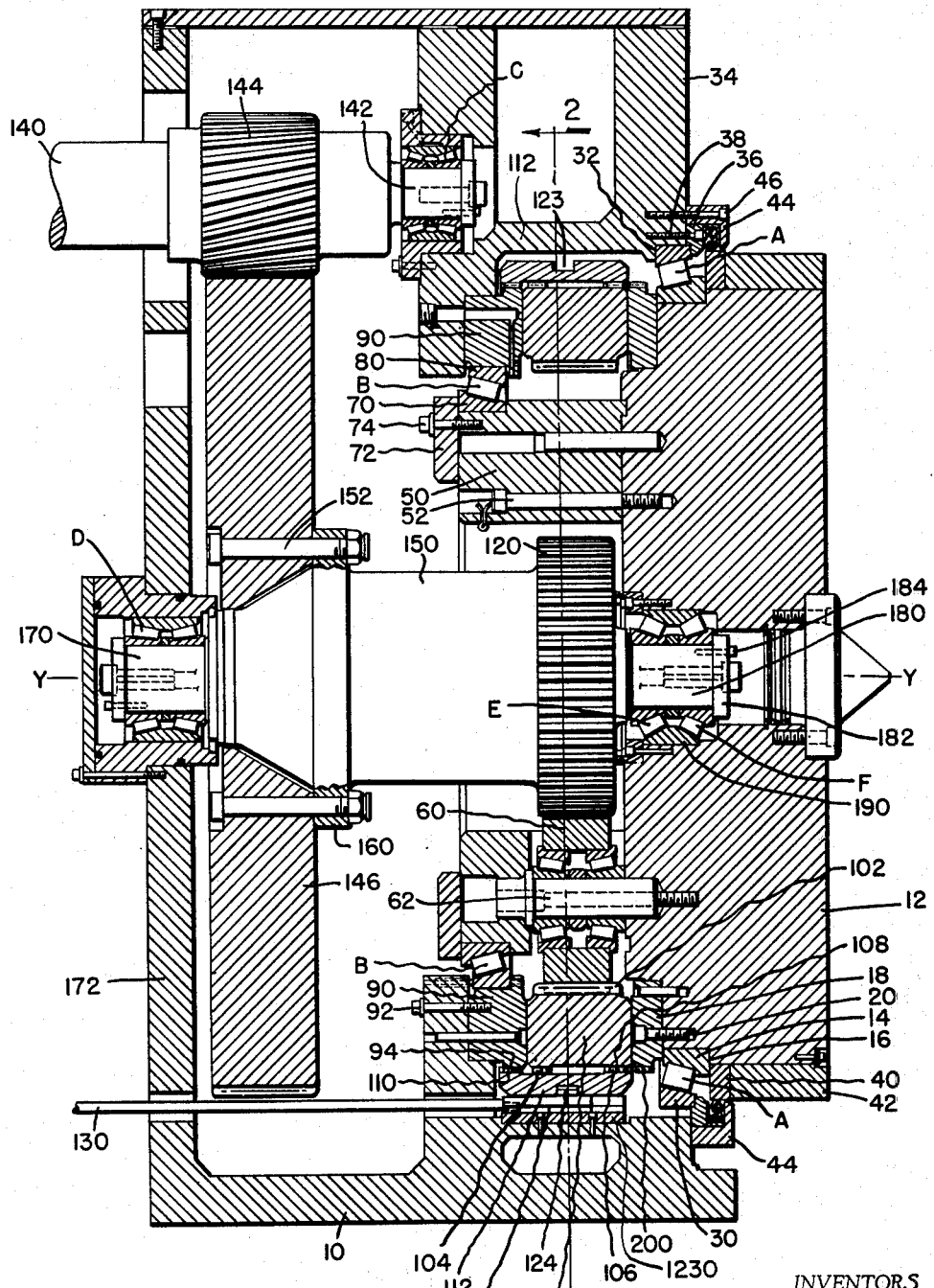

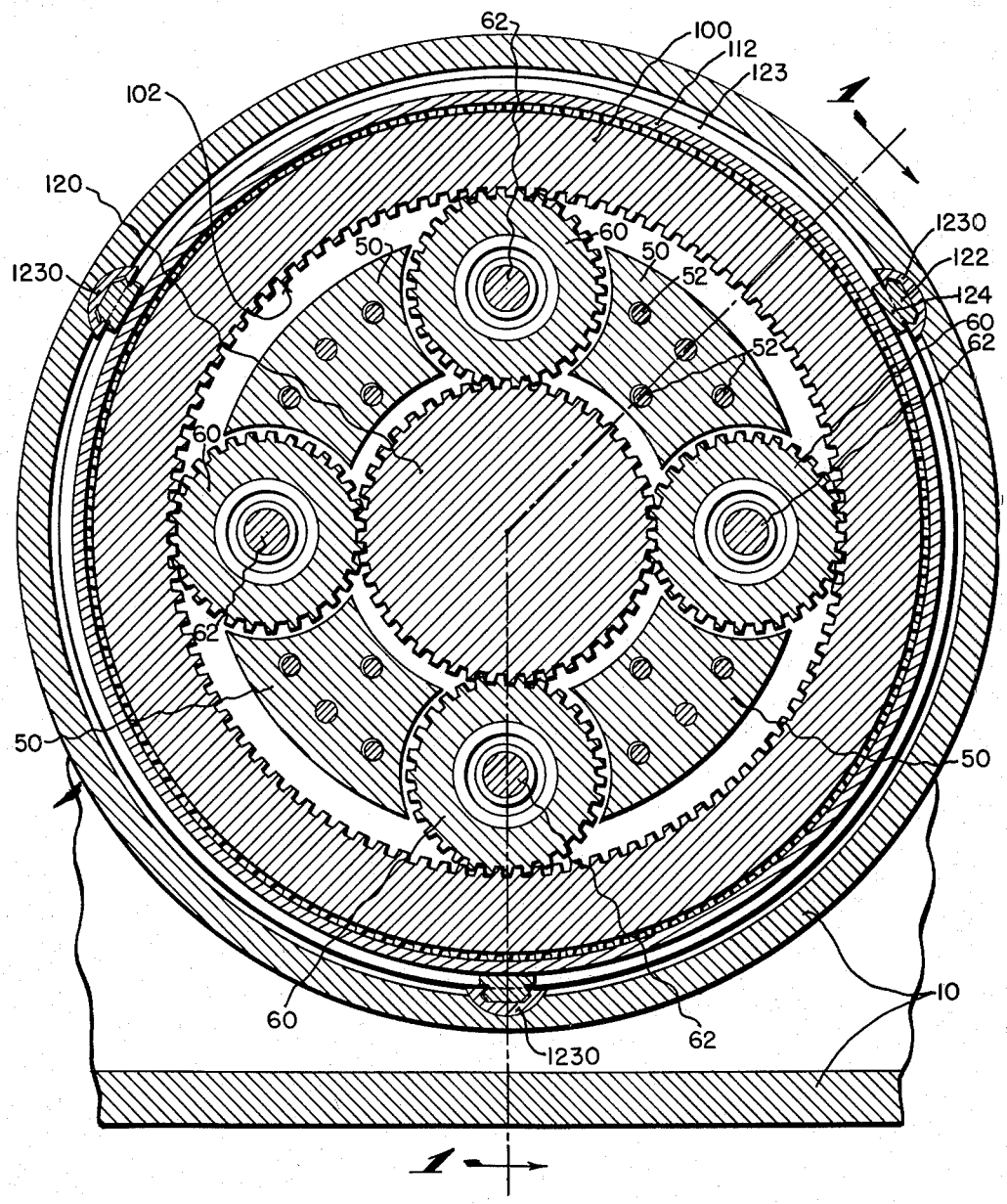

3,194,093
ROLL LATHE FACE PLATE MOUNTING
Jack N. Binns, 4386 Oaklawn Drive, Cincinnati 27, Ohio, Carl E. Clutter, Mason, Ohio, and Roger Heaton, Amelia, Ohio; said Clutter and said Heaton assignors to said Jack N. Binns
Filed May 9, 1962, Ser. No. 194,748
16 Claims. (Cl. 82—28)

This invention relates to a headstock assembly, and more particularly to the manner of securing a face plate relative to the headstock frame.

An object of the invention is to provide simple yet highly effective means for rotatably mounting the face plate of a roll lathe directly to the headstock, rather than on the spindle as has heretofore been the common practice.

Another object of the invention is to provide a headstock assembly wherein the outboard main spindle bearing is provided in the face plate which is rotatably journaled to the headstock.

These and other objects are attained by the means disclosed herein and as described in the accompanying drawings, FIG. 1 of which comprises a sectional view on line 1—1 of FIG. 2 through a headstock assembly embodying the teachings of the present invention, wherein the driving means includes three or a greater uneven number of planetary gears.

FIG. 2 is a sectional view taken on line 2—2 of FIG. 1.

The numeral 10 denotes generally a headstock and the numeral 12 a face plate which is rotatably secured to and carried by the headstock, and supported thereon by the forward bearing assemblies A and the rearward bearing assemblies B.

The forward bearing assemblies A include an inner race 14 which is received within annular peripheral channel 16 in the rear portion of the face plate 12 and which is secured in place by means of splined ring or locking plate 18 secured to the face plate by bolts 20.

The outer race 30 is secured to and carried by the headstock, said race being suitably received within an annular channelway 32 provided in the forward face 34 of the headstock 10. A retainer ring 36 fastened by bolts 38 secures the outer race 32 to the headstock.

The numeral 40 denotes generally a metallic sealing ring which is interposed between an outer face of the inner race 14 and a brake ring 42 which circumscribes the outer periphery of the face plate. A seal retainer 44 secured to the headstock by bolts 46 completes the forward mounting of the face plate relative to the headstock.

The numeral 50 denotes a planetary support ring which is secured by bolts 52 directly to the rear face of the face plate. A plurality of planetary gears 60 are secured to and carried by the face plate and support ring 50 by shafts 62; it being understood that the assembly of two or more planetary gear units are disposed concentric with respect to the axis Y—Y.

The rear portion of planetary support ring 50 is rotatably journaled to the headstock by means of bearings B, inner race 70 being secured to and carried by the planetary support ring 50 by means of retainer plate 72 and bolts 74 which project through plate 72 and threadably engage portions of ring 50. Outer race 80 is fixed relative to the headstock by means of a spline or annular locking plate element 90 which is bolted to the headstock as at 92, said element being provided with external gear-like teeth 94.

A ring gear 100 having internal teeth 102 which are engaged by the teeth of planetary gears 60 is located between retainer 18 and element 90, as illustrated. Said ring gear 100 has formed on the outer face thereof a pair of laterally spaced external splines having teeth 104 and 106, respectively, which are selectively engageable by laterally spaced internal teeth 108 and 110 of a shiftable rate selector, or splined ring, in the form of an internal gear 112. As illustrated in the drawing, external teeth 106 of ring gear 100 are in mesh with teeth 108 of shiftable gear 112, and its other set of teeth 110 in turn mesh with peripheral teeth 94 of the stationary splined element 90. Gear 100 is thereby locked against rotary movement.

Upon and during rotation of sun gear 120, planet gears 60 will roll around the track provided by the internal teeth 102 of ring gear 100 and by way of shafts 62.

When the shiftable gear 112 is in the retracted position illustrated in FIG. 1, face plate 12 will be driven through the planetary gears 60 at a slower speed than the rate of rotation of the sun gear 120.

Axial motion may be imparted to the shifter shoes 122 having a cross key or tongue 124 which is received within an annular groove 123 provided in the outer face of shiftable gear 112 which functions as a spline, as illustrated. An actuator rod 130 is provided for each shoe 122 for enabling an operator to shift the shiftable gear or spline 112 from a location exteriorly of the headstock. The numeral 1230 denotes dovetail guides for shifter shoes 122.

The numeral 140 denotes a drive shaft the forward end 142 of which is suitably journaled as at C in the headstock. A helical gear 144 secured to and carried by shaft 140 is adapted to engage and drive bull gear 146, which is secured in driving relation with shaft 150 as by means of bolts 152, which extend through bull gear 146 and flange 160 of center shaft 150.

Sun gear 120 is preferably formed integral with the forward portion of shaft 150, as illustrated.

The rearward, or left end of shaft 150 terminates in a reduced portion 170 which is suitably journaled as at D relative to rear plate 172 of the headstock 10.

The forward or right end of shaft 150 is reduced in diameter as at 180 and is journaled for relative rotation with the face plate by means of bearings E and F. Outer raceway 190 for bearings E and F is secured to and carried by the face plate, whereas the inner races for bearings E and F are secured to and carried by cylinder 180 of shaft 150, being retained in place by retainer plate 182 which is bolted to the forward end of portion 180, as at 184.

From the foregoing, it will be noted that we have thus provided simple yet highly effective means for transmitting maximum torque to the face plate of a heavy duty roll lathe, wherein the face plate has been ruggedly mounted for rotation relative to the headstock by bearings interposed between portions of the face plate and headstock; and wherein means are provided in the headstock for rotatably mounting the forward end of the drive shaft 150.

When the shiftable gear 112 is advanced forwardly, that is, to the right (FIG. 1), teeth 108 thereof will engage gear teeth 200 of splined ring or locking plate 18 and teeth 110 will engage teeth 104 of ring gear 100 whereby the planetary gears 60 will act like keys and the face plate 12 will be rotated with and at the same speed as shaft 150.

It should be understood that various changes and modifications may be made in the structural details of the device, within the scope of the appended claims, without departing from the spirit of the invention.

What is claimed is:

1. In a roll lathe, a headstock, a face plate, a drive shaft, means rotatably supporting the face plate, externally thereof, on the headstock, means rotatably supporting one end of the drive shaft on the headstock, and other means rotatably supporting the other end of said drive shaft on the face plate.

2. In a roll lathe, a headstock, a face plate, a drive shaft having a sun gear thereon, planetary gears secured to and carried by said face plate and in driven relationship with said sun gear, means rotatably supporting the face plate on the headstock, means rotatably supporting an end of the drive shaft on said face plate for rotation therewith and relative thereto, and means for selectively coupling said planetary gears directly to said headstock or to said face plate.

3. In a roll lathe, a headstock, a face plate, annular bearings rotatably supporting the face plate for rotation directly on the headstock, a drive shaft for the face plate, a driven gear mounted on the shaft, planet gears rotatably mounted on the face plate and meshing with the driven gear, an internal ring gear supported coaxial with the driven gear by having internal teeth meshing with the planet gear and means circumscribing said ring gear for locking the ring gear directly to the headstock to prevent rotation of the ring gear, whereby driven gear actuation of the planet gears will walk the planet gears around the internal gear to effect rotation of the face plate.

4. In a roll lathe, a headstock, a face plate, annular bearings rotatably supporting the face plate for rotation on the headstock, a drive shaft for the face plate, a driven gear mounted on the shaft, planet gears rotatably mounted on the face plate and meshing with the driven gear, an internal ring gear supported coaxial with the driven gear by having internal teeth meshing with the planet gears, and means for locking the ring gear to the face plate to effect synchronous rotation of the driven gear and face plate by way of the planet and ring gears.

5. In a roll lathe, a headstock, a face plate, annular bearings rotatably supporting the face plate for rotation on the headstock, a drive shaft for the face plate, a driven gear mounted on the shaft, planet gears rotatably mounted on the face plate and meshing with the driven gear, an internal ring gear supported coaxial with the driven gear by having internal teeth meshing with the planet gears and means for selectively locking the ring gear to the headstock or to the face plate to determine the rate of rotation of the face plate with respect to the rate of rotation of the driven gear.

6. A roll lathe as specified in claim 5, in which the selective locking means includes a sliding member alternatively positionable to engage either the headstock or the face plate.

7. In a roll lathe, a headstock, a face plate, annular bearings rotatably supporting the face plate for rotation directly on the headstock, a drive shaft for the face plate having one end journaled in the headstock and its other end journaled in the face plate, a driven gear mounted on the shaft, planet gears carried by the face plate and meshing with the driven gear, an internal ring gear supported coaxial with the driven gear by having internal teeth meshing with the planet gears, and means circumscribing said ring gear for locking the ring gear directly to the headstock to prevent rotation of the ring gear, whereby driven gear actuation of the planet gears will walk the planet gears around the internal ring gear to effect rotation of the face plate.

8. In a roll lathe, a headstock, a face plate, annular bearings rotatably supporting the face plate for rotation on the headstock, a drive shaft for the face plate having one end journaled in the headstock and its other end journaled in the face plate, a driven gear mounted on the shaft intermediate said ends, planet gears carried by the face plate and meshing with the driven gear, an internal ring gear supported coaxial with the driven gear by having internal teeth meshing with the planet gears, and means for locking the ring gear to the face plate to effect synchronous rotation of the driven gear and face plate by way of the planet and ring gears.

9. In a roll lathe, a headstock, a face plate, annular bearings rotatably supporting the face plate for rotation on the headstock, a driven shaft for the face plate one end journaled in the headstock and its other end journaled in the face plate, a driven gear mounted on the shaft intermediate said ends, planet gears carried by the face plate and meshing with the driven gear, an internal ring gear supported coaxial with the driven gear by having internal teeth meshing with the planet gears, and means for selectively locking the ring gear to the headstock or to the face plate to determine the rate of rotation of the face plate with respect to the rate of rotation of the driven gear.

10. A roll lathe as specified in claim 9, in which the selective locking means includes a sliding member alternatively positionable to engage either the headstock or the face plate.

11. In a roll lathe, a headstock, a face plate, annular bearings rotatably supporting the face plate for rotation directly on the headstock, a drive shaft coaxial with said bearings, a driven gear on the shaft, a plurality of planet gears rotatably supported by the face plate and meshing with said driven gear, a floating internal ring gear circumscribing and meshing with said plurality of planet gears and supported thereby, and means circumscribing said ring gear for locking the internal ring gear directly to the headstock to effect planetary drive of the face plate at a reduced rate as respects the rate of operation of the driven gear.

12. A headstock structure as specified in claim 11, in which the internal ring gear locking means includes a pair of locking plates secured to the headstock and face plate respectively, the internal gear having exterior gear teeth on its periphery, and a shiftable rate selector having teeth engageable respectively with both the teeth of the locking plates and said exterior teeth of the internal ring gear to prevent relative rotation of the headstock and the internal ring gear or, alternatively, the face plate.

13. In a roll lathe, a headstock, a face plate, annular bearings rotatably supporting the face plate for rotation on the headstock, a drive shaft coaxial with said bearings, a driven gear on the shaft, a plurality of planet gears rotatably supported by the face plate and meshing with said gear, a floating internal ring gear circumscribing and meshing with said plurality of planet gears and supported thereby, and means for locking the internal ring gear to the face plate to effect rotary drive of the face plate in synchronism with that of the driven gear.

14. A headstock structure as specified in claim 13, in which the internal ring gear has exterior gear teeth on its periphery, and the locking means for said gear include a locking plate secured to the face plate, and a second locking plate secured to the headstock, and a shiftable rate selector having teeth engageable respectively with the locking plate on the face plate and the exterior teeth on the internal ring gear to prevent relative rotation of the face plate and said internal gear, or with the locking plate on the headstock and the exterior teeth on the internal ring gear to prevent relative rotation of the internal ring gear to said headstock.

15. In a roll lathe, a headstock, a face plate, annular bearings rotatably supporting the face plate for rotation of the headstock, a drive shaft coaxial with said bearings, a driven gear on the shaft, a plurality of planet gears rotatably supported by the face plate and meshing with said gear, a floating internal ring gear circumscribing and meshing with said plurality of planet gears and supported thereby, and means for selectively locking the ring gear to the headstock or to the face plate to determine the rate of rotation of the face plate with respect to the rate of rotation of the driven gear.

16. A headstock structure as specified in claim 15, in which the internal gear has exterior teeth on its periphery, and the locking means for said gear include a first locking plate secured to the headstock, a second locking plate secured to the face plate, and a rate selector slidably supported by the headstock having portions for simultaneous engagement with the teeth on the gear and with one or the other of the locking plates for locking the gear against rotation with respect to the selected engaged plate.

References Cited by the Examiner

UNITED STATES PATENTS

| | | | |
|---|---|---|---|
| 162,444 | 4/75 | Wilbraham | 82—28 |
| 356,509 | 1/87 | Spencer | 82—28 X |
| 1,192,450 | 7/16 | Parsons et al. | |
| 1,582,821 | 4/26 | Ingham | 82—28 X |
| 2,012,066 | 8/35 | Haas et al. | 82—28 |

FOREIGN PATENTS 14,691  6/13  Great Britain.

WILLIAM W. DYER, Jr., *Primary Examiner.*